C. H. DRIVER.
HACKSAW BLADE ADJUSTER.
APPLICATION FILED JAN. 25, 1918.
1,302,643.
Patented May 6, 1919.
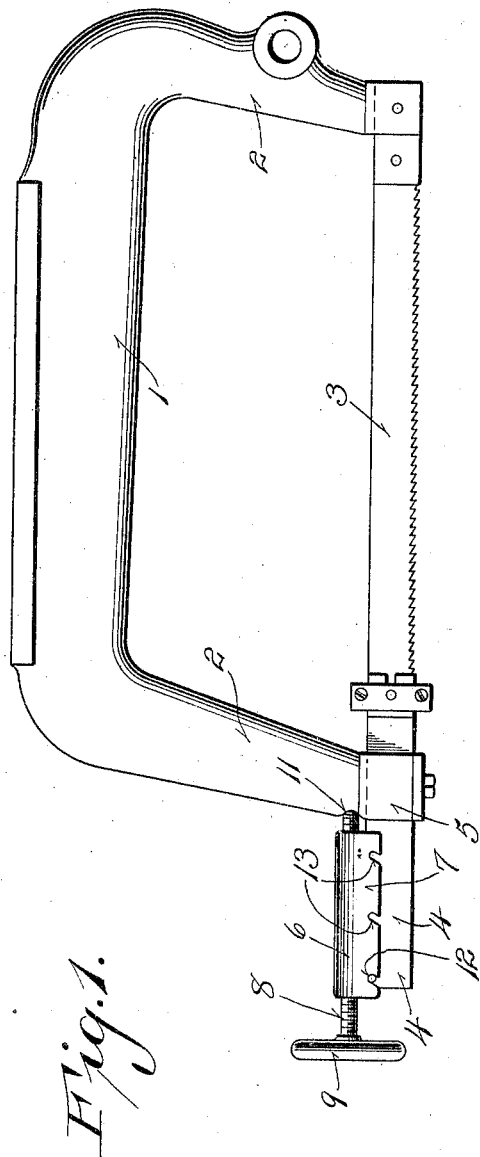
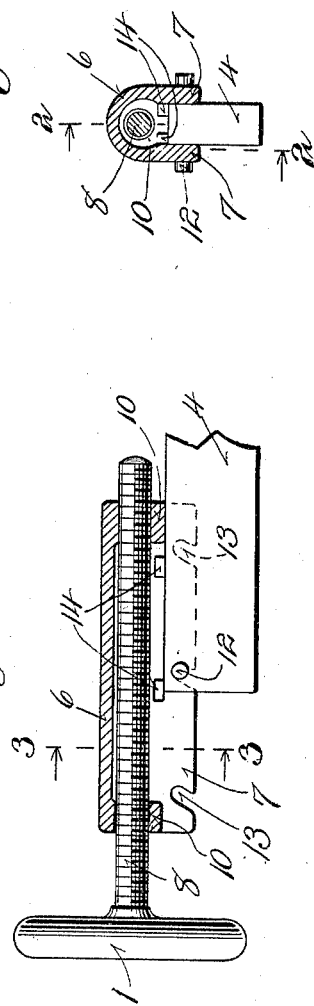

UNITED STATES PATENT OFFICE.

CHARLES H. DRIVER, OF RACINE, WISCONSIN, ASSIGNOR TO J. MOORES JONES, OF RACINE, WISCONSIN.

HACKSAW-BLADE ADJUSTER.

1,302,643.  Specification of Letters Patent.  Patented May 6, 1919.

Application filed January 25, 1918. Serial No. 213,661.

*To all whom it may concern:*

Be it known that I, CHARLES H. DRIVER, a citizen of the United States, and resident of Racine, in the county of Racine and State of Wisconsin, have invented certain new and useful Improvements in Hacksaw-Blade Adjusters; and I do hereby declare that the following is a full, clear, and exact description thereof.

My invention relates broadly to improvements for adjusting blades of metal cutting machines, more particularly to means for tensioning the saw blades of power hack saws.

My invention has for its particular object the improvement of hack saws such as shown in my copending application Serial No. 177,664 and is adapted to be used in conjunction with the improvements illustrated in my companion application Serial No. 202,173.

A further object is to provide simply constructed means whereby hack saws of different lengths may be used in a frame or saw carrier of various dimensions.

Still another object is to provide a tensioning device which will have a quickly detachable adjustable engagement with the saw blade or blade attaching member.

With the foregoing and other objects in view the invention resides in the novel features of construction, combination and arrangement of parts which will be hereinafter more particulary described and claimed and shown in the drawings, wherein:

Figure 1 represents a saw carrying frame for use on power cutting machines, said frame having a blade carried thereby and held in position by my invention.

Fig. 2 is a detail longitudinal sectional view taken substantially on the plane of the line 2—2 of Fig. 3, and Fig. 3 is a detail transverse sectional view taken on the plane of the line 3—3 of Fig. 2.

Although I have illustrated my improvement as used in connection with a power hack saw I wish it to be understood that such invention is not limited to use with such machines but can be applied to hand saws or the like by slight modifications.

In the drawing the numeral 1 designates the saw carrying frame of a power hack saw having depending legs 2 to the free ends of which a saw blade 3 is adjustably and detachably connected. In connecting this blade with the frame one end is secured to one leg, the other end being connected in any suitable manner to a blade attaching member or bar 4 which is in the form of an elongated plate of strip. This bar 4 is slidably disposed through a guide 5 carried by the end of the other leg 2.

My invention is adapted to be used with the foregoing structure and consists of a channeled housing 6 having flanges 7 which are disposed on each side of the bar 4, and a tensioning screw having a shank 8 and a handle 9. For connecting the screw to the housing 6 webs 10, 10', connect the opposite ends of the flanges 7 and the adjacent portions of the base, said webs being provided with alined openings one of which is threaded to receive said shank 8.

The free or bottom edges of the webs 10 are spaced from the adjacent edges of the flanges 7 as shown clearly in Fig. 2 whereby the housing 6 may be seated on one edge, preferably the upper edge, of the bar 4. When the housing is disposed in this position the free end of the shank 8 is adapted to be engaged in a notch or seat 11 in the adjacent leg 2 of the saw frame; said end is moved toward or away from said leg by rotation of the handle 9.

The preferred means for connecting the housing 6 to the bar 4 consists of a transversely extending pin 12 projecting through both sides of the latter and a plurality of alined open ended slots or kerfs 13 formed in the free edges of the flanges 7. In operation the pin 12 is engaged in any pair of said plurality of slots 13 depending upon the length of the saw blade 3. This arrangement provides a considerable range of adjustment and permits various lengths of saw blades to be used.

In order to procure as great an extent of adjustment as possible the pin 12 is close to the free end of the bar 4, therefore a plurality of lugs 14 are formed on the inner face of the flanges 7, one of these lugs being adjacent each of the slots 13. These lugs are so positioned with respect to the ends of the slots that they will engage the upper edge of the bar 4 as shown in Figs. 2 and 3, one of said lugs being always between the pin 12 and the free end of said bar 4. Owing to this point of connection between the bar 4 and the lugs the housing 6 and parts carried thereby will always be held in a plane parallel to the plane of the upper edge of said member and consequently parallel to the direction of movement of the saw blade. This prevents a disengagement of the shank of the screw 8 from the leg 2 after the proper adjustment has been once secured.

From the foregoing description taken in connection with the accompanying drawing it is obvious that a simply constructed and positive adjusting or tensioning device has been provided for hack saws.

I claim:—

1. In a device of the class described the combination with a carrying frame, a cutting blade or the like carried by said frame, of means for tensioning said blade or the like comprising a channeled housing slidably engaged with one edge of the blade or the like, coöperative retaining means on said housing and blade or the like, and means engageable with said carrying frame for moving said housing away from the latter.

2. In a device of the class described the combination with a carrying frame, a cutting blade or the like carried by said frame, of means for tensioning said blade or the like comprising a channeled housing slidably engaged with one edge of the blade or the like, said housing having a plurality of notches in one edge, a pin carried by the blade or the like for selectively engaging one of said notches to retain said housing and blade in detachable engagement, and means engageable with said carrying frame for moving said housing away from the latter.

3. In a device of the class described the combination with a carrying frame, a cutting blade or the like carried by said frame, of a channeled housing slidably engaged with one edge of the blade or the like, said housing having a notch formed in one edge, a pin carried by the blade or the like to engage in said notch, a lug projecting from the housing to contact with one edge of said blade or the like when said notch and pin engage, and means adjustably connecting the housing and frame to procure tension of the blade or the like.

4. In a device of the class described the combination with a carrying frame, a cutting blade or the like carried by said frame, of a channeled housing slidably engaged with one edge of the blade or the like, said housing having a plurality of notches formed in one edge, a plurality of lugs carried by the housing, one of said lugs being disposed adjacent each of said notches, and a pin carried by the blade or the like to engage in any one of said notches, one of said lugs being engaged with one edge of said blade or the like when said pin is disposed in either of said notches.

5. In a device of the class described the combination with a carrying frame, a cutting blade or the like carried by said frame, of a channeled housing slidably engaged with one edge of the blade or the like, a web disposed across the opposite ends of the flanges of the housing, one of said webs having a threaded hole, the free edges of the flanges of the housing being provided with a plurality of notches, a screw extending through said threaded hole to engage said supporting bar, a pin carried by the blade or the like to engage in either of said notches, and lugs spaced from the base of the channeled housing and carried thereby, one of said lugs being disposed adjacent each of said notches whereby the same will contact with one edge of the blade or the like when said pin is engaged in either of said notches.

In testimony that I claim the foregoing, I have hereunto set my hand at Milwaukee, in the county of Milwaukee and State of Wisconsin.

CHARLES H. DRIVER.

Copies of this patent may be obtained for five cents each, by addressing the "Commissioner of Patents, Washington, D. C."